April 5, 1966   W. S. CAUDLE   3,244,441

CRIMPED TUBE JOINT

Filed Dec. 28, 1961

INVENTOR.
WAYNE S. CAUDLE
BY
Harold D. Jones
ATTORNEY

UnitedStates Patent Office 3,244,441
Patented Apr. 5, 1966

1

3,244,441
CRIMPED TUBE JOINT
Wayne S. Caudle, Chamblee, Ga., assignor to Mueller Co., Decatur, Ill., a corporation of Illinois
Filed Dec. 28, 1961, Ser. No. 162,709
1 Claim. (Cl. 285—374)

This invention relates to the joining of pipe sections and, more particularly, to an improved pipe fitting, method, and tools for joining pipe sections which permits the pipe sections to be quickly joined to form a joint having the pipe sections firmly held in position, which is liquid or gas tight, and which can be readily repaired if vibration, age, or other factors cause a loosening of the joint.

The many industrial, commercial, and home requirements for quickly and economically joining pipe sections in a structurally secure and often liquid or gas tight manner have resulted in a variety of pipe fittings or unions being proposed or used over the years. Many of these previously proposed or used pipe fittings or unions, and the methods associated with their use, have utilized various O-ring or gasket arrangements, but they have not been wholly satisfactory since it is often difficult and time-consuming to assemble the joint, since the O-ring or gasket is frequently displaced or damaged during the assembly of the joint, since the pipe sections are frequently not securely held in position, since the O-ring frequently does not provide an effective liquid or gas seal, and since it is frequently impossible or difficult to repair the joint if the pipe sections loosen or the O-ring deteriorates with age or use.

The invention disclosed herein completely overcomes these unsatisfactory features associated with previously proposed or used structures and methods for joining pipe sections since it permits pipe sections to be quickly and easily joined without damage or displacement of the O-ring and since it provides a pipe joint in which the pipe sections are firmly held in position, in which the O-ring is positioned after the assembly of the joint for more effective sealing, and which may be easily repaired by tightening the O-ring seal or the positioning of the pipe sections. These improvements in the joining of pipe sections are obtained by a pipe fitting having at least one compressible ring formed in its circumference which provides a circular groove in the interior surface of the pipe fitting whose depth can be decreased by compression of the compressible ring, having an O-ring positioned in the groove, and having portions of its circumference adjacent to the compressible ring which can be crimped against pipe sections inserted into the pipe fitting and through O-ring.

A simple and effective tool is provided for crimping the pipe fitting and compressing one or more compressible rings to the proper degree. Thus, to join pipe sections, it is simply necessary to insert the ends of the pipe sections into the pipe fitting, to crimp the pipe fitting against the inserted ends of the pipe sections and thereby hold the pipe sections securely in the pipe fitting and seal the joint, and to compress a compressible ring and thereby obtain an additional liquid or gas seal because the O-ring in the groove formed by the compressible ring is compressed between the interior surface of the pipe fitting and the exterior surface of the pipe section. It should be noted that the initial position of an O-ring in a groove prevents the O-ring from being damaged or displaced when the pipe section is inserted into the pipe fitting and that a structurally loose or leaking joint can be repaired simply by re-crimping the pipe fitting or recompressing the compressible ring or rings of the pipe fitting.

2

These and other features of the invention will be more clearly understood from the following detailed description and the accompanying drawings in which like characters designate corresponding parts in all figures and in which:

FIGURE 1 is a section view taken of a joint in the center line of a pipe section having one end inserted into one end of a pipe fitting and shows these pipe section and pipe fitting ends as they appear immediately after the end of the pipe section has been inserted into the end of the pipe fitting.

FIGURE 2 is a section view of a joint taken in the center line of a pipe section having one end inserted into one end of a pipe fitting and shows these pipe section and pipe fitting ends after the pipe fitting has been crimped against the pipe section and after two compressible rings have been compressed to squeeze the O-rings between the interior surface of the pipe fitting and the exterior surface of the pipe section, and two pairs of crimping and compressing tool rollers having a configuration which will simultaneously crimp the pipe section and compress the compressible rings in the manner shown.

Figure 1:
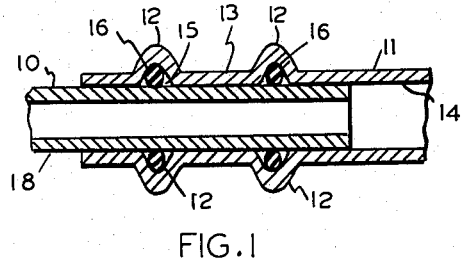

These drawings and the following detailed description disclose a preferred specific embodiment of the invention, but the invention is not limited to the details disclosed since it may be embodied in other equivalent forms.

The pipe fitting structure, method, and tools for joining pipe sections which are described herein are most easily understood by considering their application in the joining of a substantially straight hollow pipe section 10 with one end of a pipe fitting 11 to form a joint. The specific pipe fitting 11 described may be regarded as a pipe fitting 11 having two similarly constructed ends, as a special purpose fitting such as a T, or as simply the end of another pipe section 10 which has been adapted to have the structural characteristics to be described below. This is because the features of the pipe fitting 11 described are readily adaptable to a variety of specific applications. Thus, it should be understood that the pipe fitting 11 described herein is that portion of a fitting, pipe section, or other structure which is actually joined to a pipe section 10.

The pipe fitting 11 is a hollow tube made of brass or any other strong, but compressible, material and having one or more compressible rings 12 extending around its circumference. Each compressible ring 12 is a portion of the pipe fitting 11 which has exterior and interior surface diameters which are larger than the corresponding diameters of adjacent portions of the pipe fitting 11. Thus, when the exterior surface 13 of the pipe fitting 11 is viewed, the compressible ring 12 appears as a ridge or ring extending around the circumference of the pipe fitting 11, and when the interior surface 14 of the pipe fitting 11 is viewed, the compressible ring 12 appears as a groove 15 extending around the circumference of the interior surface 14 of the pipe fitting 11 to form a recess or cavity. Within this groove 15 is placed an O-ring 16 of rubber, plastic, or similar material and having sufficient rigidity and an inside diameter sufficiently large for the O-ring 16 to be effectively contained within the groove 15.

From the foregoing, it is apparent that the pipe fitting 11 is effectively a hollow tube having no interior surface 14 obstructions, and that when its interior surface 14 diameter is larger than the exterior surface 18 diameter of a pipe section 10, the pipe fitting 11 permits the easy and rapid insertion of a pipe section 10 into the pipe fitting 11. Moreover, the recess of the O-ring 16 in the groove 15 of the compressible ring 12 not only prevents the O-ring 16 from obstructing the insertion of the pipe section 10, but also prevents the O-ring 16 from being displaced or damaged when the pipe section 10 is inserted.

Once a pipe section 10 has been positioned within the pipe fitting 11, one or more crimps 17 is forced into that portion of the pipe fitting 11 which surrounds the pipe section 10. Each crimp 17 extends completely around the circumference of the pipe fitting 11, and each crimp 17 forces the interior surface 14 of the pipe fitting 11 to engage the exterior surface 18 of the pipe section 10 so as to securely hold the pipe section 10 in the pipe fitting 11. A crimp 17 will also effectively seal the joint and prevent the escape of liquid or gas from the joint. It should be noted that if the pipe section 10 is itself made of compressible material such as copper, the crimping of the pipe fitting 11 will also force an indentation or crimp 17 into the exterior surface 18 of the pipe section 10, and the interlocking crimps will provide an even more secure liquid or gas seal and locking of a pipe section 10 into the pipe fitting 11.

Subsequent or simultaneous to the crimping of the pipe fitting 11, a compressible ring 12 of the pipe fitting 11 is compressed along its entire circumference toward the center line of the pipe section 10. As a result, the groove 15 in the pipe fitting 11 is decreased in interior surface diameter so that an O-ring 16 in the groove 15 is squeezed between the interior surface 14 of the pipe fitting 11 and the exterior surface 18 of the pipe section 10. This squeezing of an O-ring 16 by compressing the compressible ring 12 insures that there is a tight seal between the interior surface 14 of the pipe fitting 11 and the exterior surface 18 of the pipe section 10 which will prevent the escape of any liquid or gas which might pass a crimp 17 in the pipe fitting 11.

Although one crimp 17 and the compression of one compressible ring 12 in the pipe fitting 11 will provide a structurally secure and liquid or gas tight joint for most purposes, it has been found that even better results are obtained by using a pipe fitting 11 having two or more compressible rings 12 and by crimping the pipe fitting 11 at least once on both sides of each compressible ring 12.

Crimps 17 on both sides of a compressible ring 12 not only serve to hold more securely a pipe section 10 in the pipe fitting 11 and to increase the gas and liquid seal of the joint by providing a plurality of tightly restricted areas between a pipe section 10 and a pipe fitting 11, but this crimp 17 arrangement serves to protect a compressed O-ring 16 between adjacent crimps 17 from sudden surges of gas or liquid pressure and from exposure to the damaging effects of the gas or liquid material carried in the pipe section 10 or joint. Thus, the O-ring 16 will serve as a lasting and effective seal against any leaking of liquid or gas which happens to pass the crimps 17 because the O-ring 16 is protected from the material carried in the pipe section 10. It should be noted that when a plurality of crimps 17 and compressible rings 12 are used, a single crimp 17 between adjacent compressible rings 12 can serve as the crimp 17 on one side of each of the compressible rings 12.

Not only is a pipe joint easily formed by simply crimping the pipe fitting 11 and compressing one or more compressible rings 12, but it should be noted that in the event a pipe section 10 becomes loose in a pipe fitting 11 or the joint starts to leak liquid or gas after a period of time, the joint may be quickly repaired by deepening the crimps 17 in the pipe fitting 11 and by further compressing a compressible ring 12 so as to further squeeze an O-ring 16 between the interior surface 14 of the pipe fitting 11 and the exterior surface 18 of the pipe section 10.

Figure 3:
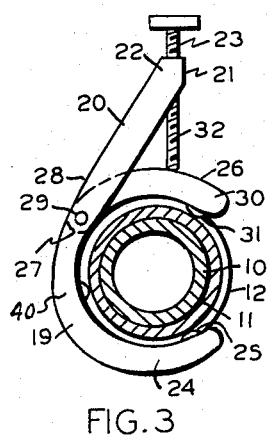
FIGURE 3 is a side elevation view of a crimping and compressing tool for simultaneously crimping a pipe fitting and compressing a compressible ring of the pipe fitting using the rollers shown in FIGURE 2 and shows the tool placed in crimping and compressing position on a pipe fitting with a pipe section inserted.
Figure 4:
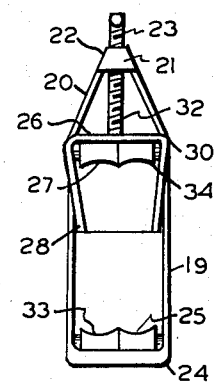
FIGURE 4 is a front elevation view of the crimping and compressing tool shown in FIGURE 3 with the pipe fitting and inserted pipe section removed for clarity and with the movable jaw of the tool rotated upward so as to permit the tool to be easily placed in position on a pipe fitting.

Although a variety of tools may be used to crimp the pipe fitting 11 one or more times and to compress one or more compressible rings 12, either separately or simultaneously, it has been found that a crimping and compressing tool 19, as shown in FIGURES 3 and 4, permits all of these operations to be simultaneously performed in a quick and effective manner.

The crimping and compressing tool 19 is comprised of a stationary jaw 20 formed into a cylinder 21 at its upper end 22 through which is threaded a set screw 23. At its lower end 24, the stationary jaw 20 of the crimping and compressing tool 19 is curved so that the stationary jaw 20 resembles the letter "J". A pair of rollers 25 are rotatably mounted at the lower end 24 of the stationary jaw 20 on an axis of rotation which is perpendicular to the center line of the set screw 23 so that the set screw 23 moves generally toward and away from the rollers 25 as the set screw 23 is rotated within the cylinder 21 at the upper end 22 of the stationary jaw 20 of the tool 19. A movable jaw 26 is rotatably attached at one end 27 to the middle portion 28 of the stationary jaw 20 by a pin 29. At its movable end 30, this movable jaw 26 carries a pair of rollers 31 having a surface configuration substantially identical to the surface configuration of rollers 25 and having an axis of rotation parallel to the axis of rotation of rollers 25. The lower end 32 of the set screw 23 will engage the movable end 30 of the movable jaw 26, and rotation of the set screw 23 in one direction in the cylinder 21 will force the movable end 30 and rollers 31 to move toward rollers 25. Thus, if a pipe fitting 11 is placed between the stationary jaw 20 and the movable jaw 26, the rotation of the set screw 23 will force rollers 25 and 31 against the pipe fitting 11. Rotation of the set screw 23 in the opposite direction in the cylinder 21 will, of course, release set screw 23 pressure and release the pipe fitting 11.

The specific crimping and compressing action desired is obtained by the roller 25 and the roller 31 configuration. For some applications, each of the rollers 25 and 31 has a compressing portion 33 of reduced diameter at or near the midpoint of the roller 25 or 31 length and has relatively sharp, large diameter crimping portions 34 and flanges 35 at each end. The crimping and compressing tool 19 is placed upon the pipe fitting 11 so that the compressing portions 33 of the rollers 25 and 31 are adjacent to compressible rings 12 and the crimping portions 34 of the rollers 25 and 31 are engaging portions of the exterior surface 13 of the pipe fitting 11 on both sides of a compressible ring 12. When the rollers 25 and 31 are forced toward the compressible rings 12 by further rotation of the set screw 23 to the extent necessary to engage and compress the compressible rings 12, the large diameter crimping portions 34 of each roller 25 or 31 will force crimps 17 into the pipe fitting 11. The depth of the crimps 17 and the degree to which the compressible rings 12 are compressed are determined by the flanges 35 engaging the pipe fitting 11 and resisting further motion of the rollers 25 and 31 toward each other. It is apparent that rotating the crimping and compressing tool 19 about the center line of the pipe fitting 11 will cause the proper compression of the compressible ring 12 and the forming crimps 17 completely around the circumference of the pipe fitting 11.

The flanges 35 of the rollers 25 and 31 permit the crimping and compressing tool 19 to be quickly used without danger of cutting the pipe fitting 11 with the crimping portions 34. However, when necessary to repair a joint by deepening a crimp 17 or further compressing a compressible ring 12, it is preferable to use rollers 25 and 31 not having flanges 35 or having flanges 35 of reduced diameter so as to permit the additional depth of a crimp 17 and the additional compression of a compressible ring 12 to be determined by judgment.

Figure 5:
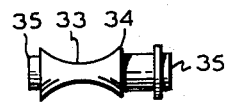
FIGURE 5 is a front elevation view of a roller having a configuration which when substituted for the roller configuration used on the rollers shown in FIGURE 2 will result in an increased number of crimps in a pipe fitting adjacent to the compressible rings.
Figure 2:
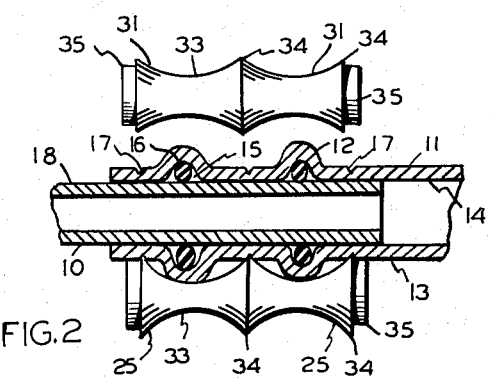
Figure 6:
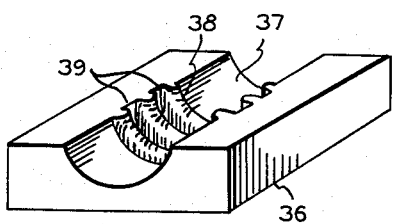
FIGURE 6 is a perspective view of a crimping and compressing die showing the cavity within which a pipe fitting is placed to be squeezed between this die and a similar die in order to crimp the pipe fitting and compress a plurality of compressible rings on the pipe fitting.

It should be noted that a crimping and compressing tool 19 having a single roller 25 and a single roller 31 with the surface configuration described above may be used to simultaneously compress one compressible ring 12 and form crimps 17 on opposite sides of the compressible ring 12 and that if positioned twice upon a pipe fitting 11 such a tool 19 will accomplish the same crimping of the pipe fitting 11 and the same compression of compressible rings 12 as is accomplished by a tool 19 using the pair of rollers 25 and the pair of rollers 31 described herein. Similarly, it should be noted that rollers 25 and 31 having a surface configuration such as that shown in FIGURE 5 will result in a plurality of crimps 17 being formed on one or both sides of a compressible ring 12 and that other arrangements of crimping portions 34 and compressing portions 33 are possible. In addition it should be noted that an additional roller 25 or 31 or set of rollers 25 or 31 may be positioned in the stationary jaw 20 of the tool 19 at point 40 between the lower end 24 and the pin 29 so as to insure that the tool 19 will not bind against the pipe fitting 11 as the tool 19 is rotated about the pipe fitting 11.

Moreover, it should be emphasized that any tool 19 which will crimp the pipe fitting 11 and compress a compressible ring 12 will permit the forming of a joint which is structurally sound and which will prevent the escape of gas or liquid. For example, in these applications where rotation of a crimping and compressing tool 19 such as that described above is not possible or is difficult because of space limitations or where more or less mass production of joints is desired, the forcing of two dies 36 together around the pipe fitting 11 will provide the necessary crimps 17 and compressing of compressible rings 12. Any suitable means may be used to force the dies 36 together, and the basic contour of each die cavity 37 is the reverse of the contour of that half of exterior surface 13 of the pipe fitting 11 which is engaged by the die 36. However, the die cavities 37 contain ridges 38 which will force crimps 17 into a pipe fitting 11 squeezed between them and contain scores 39 within which the compressible rings 12 of the pipe fitting 11 are aligned, but whose depth is such that the compressible rings 12 will be compressed by the surface of the scores 39 when the dies 36 are forced together.

Figure 7:
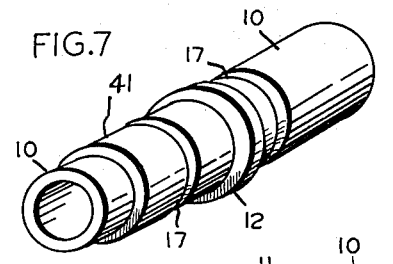
FIGURE 7 is a perspective view of a joint wherein one end of a pipe section has been inserted into the end of another pipe section which has been adapted to serve as an integral pipe fitting having a compressible ring and crimpable portions.
Figure 8:
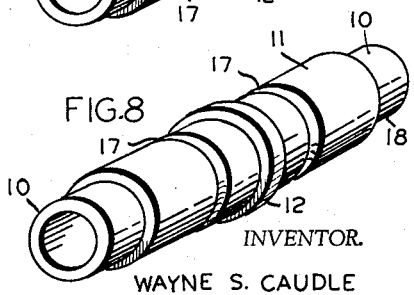
FIGURE 8 is a perspective view of a joint wherein two pipe sections have been joined by inserting one end of each into a pipe fitting, by crimping the pipe fitting at a plurality of locations, and by compressing a plurality of compressible rings.

It should be noted again that the utilization of the pipe structure described herein in the forming of joints is susceptible to a wide variety of applications. For example, it may be used in a typical pipe fitting 11 arrangement having two pipe sections 10 inserted into the pipe fitting 11 as shown in FIGURE 8, or it may be used to join two pipe sections 10 wherein the end 41 of one pipe section 10 has at least one compressible ring 12 as shown in FIGURE 7. In summary, the invention described herein provides a pipe structure, a method, and tools for quickly and efficiently forming a joint between pipe sections under a variety of circumstances which is not only structurally sound and gas or liquid sealed, but which can be readily repaired.

What is claimed as invention is:

A joint between a first pipe section and a second pipe-section comprising, in combination, a first pipe section provided with at least one integral deformable annular bulge providing a radially inwardly opening ring-like groove spaced from the ends of said first pipe section, said annular bulge provided with a maximum outside diameter larger than the outside diameter of said first pipe, said groove having a maximum diameter larger than the outside diameter of the second pipe section, and an elastic O-ring positioned within said groove, said second pipe section positioned within said first pipe section, said second pipe section underlapping the said groove in the first pipe section, said first pipe section having radially inwardly deformed areas on the outer periphery thereof, thereby forming crimps thereon, said areas being adjacent to but axially removed from the juncture of the bulge with the pipe body and axially spaced from the ends of said first pipe section, the diameter of said bulge being radially inwardly reduced forcing said O-ring to compressively engage the outer surface of said second pipe section whereby said first pipe section snugly engages said second pipe section at the area of said crimps and said O-ring seals the interface between said first and said second pipe sections in fluid tight relation, the inner surface of said second pipe section in the area of said crimps and said bulge being smooth and the inner diameter of said second pipe section remaining constant and undeformed in the area of the joint.

References Cited by the Examiner

UNITED STATES PATENTS

| 2,250,286 | 7/1941 | White | 285—286 |
| 2,469,426 | 5/1949 | Anthony | 153—9 |
| 2,477,676 | 8/1949 | Woodling | 285—349 X |
| 2,702,716 | 2/1955 | Basolo et al. | 285—369 X |
| 2,770,476 | 11/1956 | Cheverly | 285—231 |
| 2,827,941 | 3/1958 | Stoltz. | |
| 2,832,503 | 4/1958 | Baumann | 285—382 X |
| 2,898,131 | 8/1959 | Kurtz | 285—231 |
| 2,940,497 | 6/1960 | Herrstrum. | |
| 3,071,993 | 1/1963 | Foster et al. | 29—517 X |

FOREIGN PATENTS

| 19,854 | 10/1895 | Great Britain. |
| 511,527 | 8/1939 | Great Britain. |
| 856,610 | 12/1960 | Great Britain. |

Corresponding U.S. Patent 3,149,861

535,806   11/1955   Italy.

CARL W. TOMLIN, *Primary Examiner.*